United States Patent [19]
Alligood

[11] Patent Number: 5,400,100
[45] Date of Patent: Mar. 21, 1995

[54] PHOTOGRAPHIC CAMERA FOR VARIOUS SIZE EXPOSURES USING ONE-PIECE MASKING BLADE ASSEMBLAGE

[75] Inventor: John H. Alligood, Penfield, N.Y.

[73] Assignee: Eastman Kodak Company, Rochester, N.Y.

[21] Appl. No.: 181,934

[22] Filed: Jan. 14, 1994

[51] Int. Cl.$^6$ ............................................. G03B 17/02
[52] U.S. Cl. ................................... 354/159; 354/94
[58] Field of Search .................................. 354/159, 94

[56] References Cited

U.S. PATENT DOCUMENTS

| | | |
|---|---|---|
| 2,002,076 | 5/1935 | Bornmann et al. . |
| 2,358,321 | 9/1944 | Fassin . |
| 2,522,387 | 9/1950 | Livens . |
| 3,348,463 | 10/1967 | Nerwin . |
| 3,349,682 | 10/1967 | Nerwin . |
| 5,086,311 | 2/1992 | Naka et al. ........................ 354/195.1 |
| 5,323,196 | 6/1994 | Labaziewicz ........................ 354/159 |

FOREIGN PATENT DOCUMENTS 619908 10/1935 Germany .
4-282635 10/1992 Japan .

Primary Examiner—Monroe H. Hayes
Attorney, Agent, or Firm—Roger A. Fields

[57] ABSTRACT

A a photographic camera capable of taking various size exposures comprises a back frame opening for making a full size exposure on a film in the camera, and respective masking blades supported for pivotal movement between a masking position for masking corresponding portions of the back frame opening to allow only a reduced size exposure to be made on the film and a non-masking position not masking the corresponding portions of the back frame opening to allow a full size exposure to be made on the film. The masking blades are connected via a rigid connecting ink having overcenter spring means, located substantially midway between the masking blades to divide the connecting ink into two similar length rigid ink segments, for applying respective forces in opposite directions to the link segments to pivot the masking blades to their masking and non-masking positions. Preferably, the masking blades and the connecting ink including is overcenter spring means are integral to be unitary or one-piece.

6 Claims, 6 Drawing Sheets

PHOTOGRAPHIC CAMERA FOR VARIOUS SIZE EXPOSURES USING ONE-PIECE MASKING BLADE ASSEMBLAGE

CROSS-REFERENCE TO RELATED APPLICATION

Reference is made to commonly assigned copending application Ser. No. 08/111,244 entitled PHOTOGRAPHIC CAMERA FOR VARIOUS SIZE EXPOSURES USING ONE-PIECE MASKING BLADE ASSEMBLAGE, and filed Aug. 24, 1993 in the name of William H. Goddard.

1. FIELD OF THE INVENTION

The invention relates generally to the field of photography, and in particular to a photographic camera capable of taking various size or various format exposures. More specifically, the invention relates to a photographic camera intended to take interspersed full size and panoramic size exposures.

2. BACKGROUND OF THE INVENTION

Prior art U.S. Pat. No. 5,086,311, issued Feb. 4, 1992, discloses a photographic camera capable of taking interspersed full size and panoramic size exposures. Typically, a full size exposure is about 24.4 mm×36.4 mm and a panoramic size exposure is about 13.3 mm×36.4 mm. Thus, the panoramic size exposure has a stretched-out or panorama-like appearance as compared to the full size exposure.

The '311 patent discloses most clearly in FIGS. 2, 3A, 3B, and 11 that, within the camera body, there is provided a (conventional) rectangular back frame opening for making full size exposures on a filmstrip. Also, respective masking blades are supported for pivotal movement between a masking position for masking an upper rectangular portion and a lower rectangular portion of the back frame opening to allow only panoramic size exposures to be made on the filmstrip and a non-masking position not masking the upper and lower portions to preclude panoramic size exposures from being made on the filmstrip, i.e. to allow full size exposures to be made on the filmstrip.

The Cross-Referenced Application

The cross-referenced application discloses a photographic camera capable of taking various size exposures comprises a back frame opening for making a full size exposure on a film in the camera, and respective masking blades supported for pivotal movement between a masking position for masking corresponding portions of the back frame opening to allow only a reduced size exposure to be made on the film and a non-masking position not masking the corresponding portions of the back frame opening to allow a full size exposure to be made on the film. The masking blades are connected via a connecting link having at least one elastic portion which constitutes a living hinge to permit the masking blades to be pivoted between their masking and non-masking positions. Preferably, the masking blades and the connecting link are integral to be one-piece.

PROBLEM TO BE SOLVED BY THE INVENTION

In U.S. Pat. No. 5,086,311, the actuating mechanism for the masking blades includes separate drive levers and pivot shafts which are individually connected to the masking blades. The drive levers are connected to each other at a motion-transmitting joint or coupling which permits the masking blades to be pivoted between their masking and non-masking positions. Thus, the actuating mechanism is a relative complex and therefore expensive mechanical device.

SUMMARY OF THE INVENTION

According to the invention, a photographic camera capable of taking various size exposures comprises a back frame opening for making a full size exposure on a film in the camera, and respective masking blades supported for pivotal movement between a masking position for masking corresponding portions of the back frame opening to allow only a reduced size exposure to be made on the film and a non-masking position not masking the corresponding portions of the back frame opening to allow a full size exposure to be made on the film, and is characterized in that:

the masking blades are connected via a rigid connecting link having overcenter spring means, located substantially midway between the masking blades to divide the connecting link into two similar length rigid link segments, for applying respective forces in opposite directions to the link segments to pivot the masking blades to their masking and non-masking positions.

Preferably, the masking blades and the connecting link including its overcenter spring means are integral to be unitary or one-piece.

ADVANTAGEOUS EFFECT OF THE INVENTION

The invention provides a mechanical arrangement which is relatively simple and therefore inexpensive as compared to the mechanical arrangement in U.S. Pat. No. 5,086,311.

DETAILED DESCRIPTION OF THE PREFERRED EMBODIMENT

The invention is disclosed as being embodied in a relatively simple 35 mm still camera. Because such a photographic camera is well known, the description which follows is directed in particular to camera elements forming part of or cooperating directly with the preferred embodiment. It is to be understood, however, that camera elements not specifically shown or described may take various forms known to persons of ordinary skill in the art.

Figure 1:
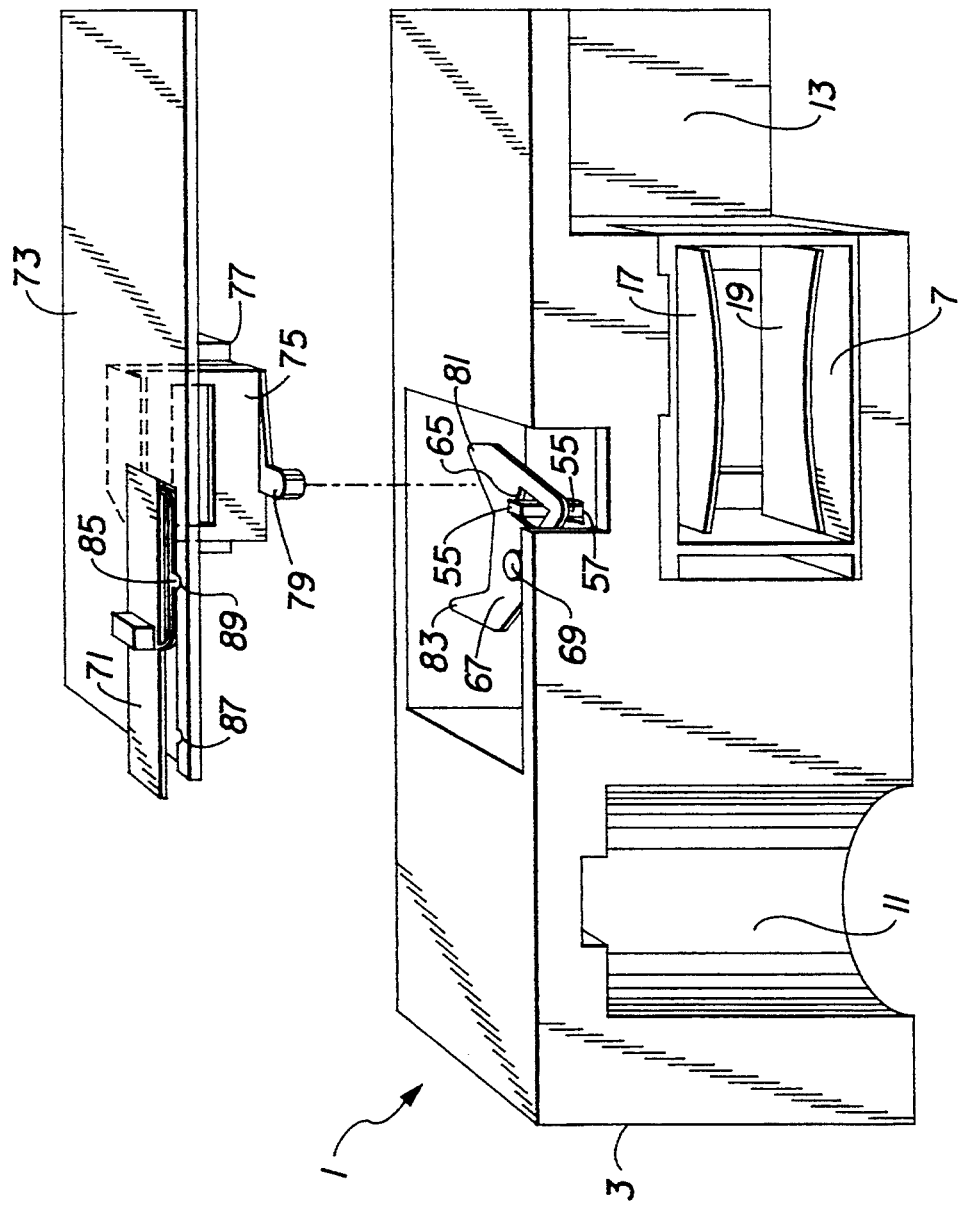
FIG. 1 is an exploded rear perspective view of a photographic camera according to a preferred embodiment of the invention, showing a pair of masking blades in a masking position within a back frame opening of the camera body to make a panoramic size exposure on a filmstrip and a masking frame in a corresponding position behind a front viewfinder lens to provide a panoramic view of the subject to be photographed.
Figure 4:
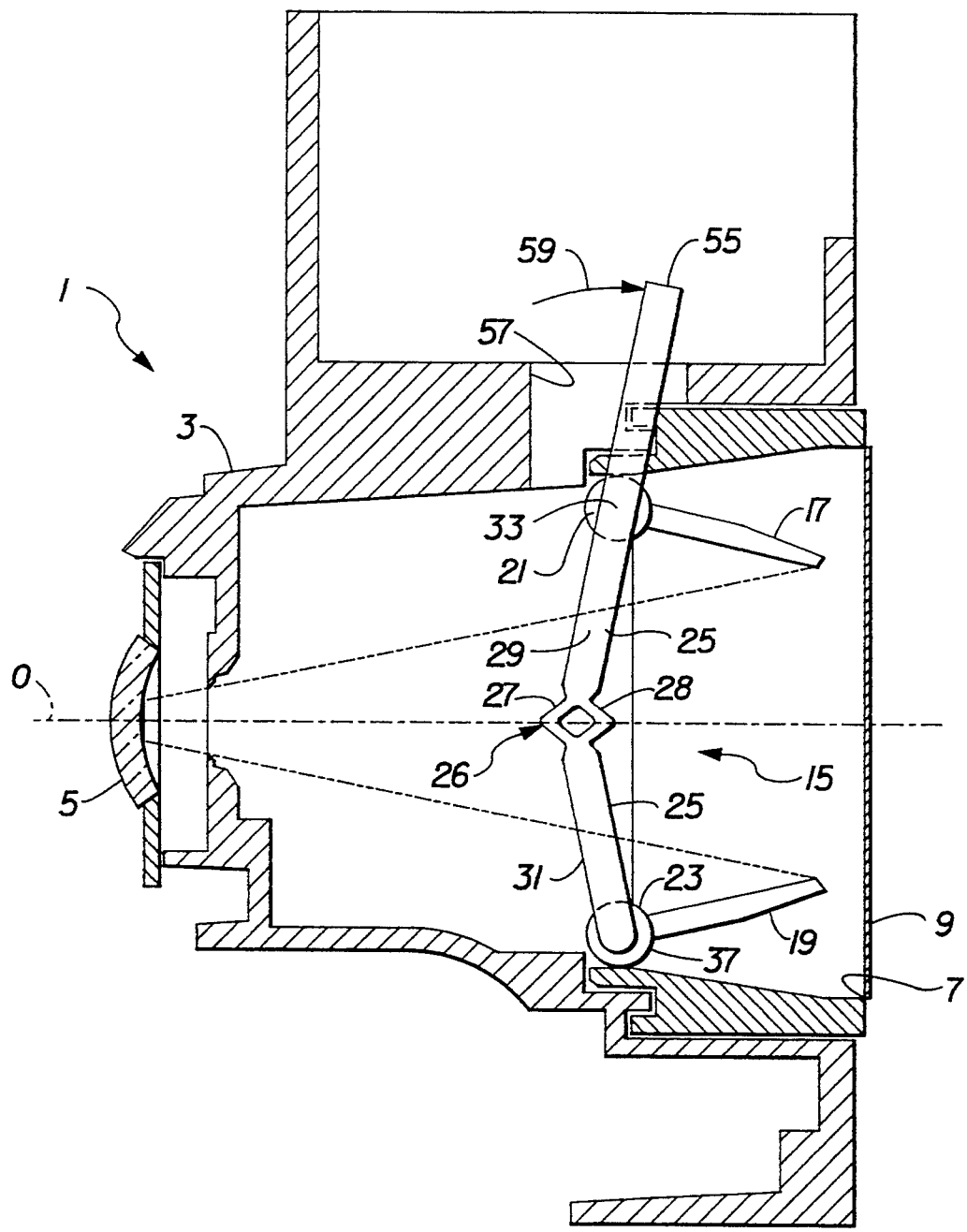
FIG. 4 is a side elevation view of the camera body, showing the masking blade assemblage with its pair of masking blades in their masking position.

Referring now to FIGS. 1 and 4 of the drawings, a photographic camera 1 has a camera body or housing 3 with a known taking lens 5 and a back frame opening 7 which are each centered on an optical axis O of the taking lens. The back frame opening 7 is rectangular shaped for making full size (about 24.4 mm×36.4 mm) exposures on respective sections of a 35 mm filmstrip 9 successively held at the back frame opening by a pressure plate (not shown). The camera body 3 has a cartridge receiving chamber 11 for a conventional 35 mm film cartridge (not shown) which normally contains the filmstrip 9 and another chamber 13 for holding the filmstrip removed from the film cartridge.

A plastic (polypropylene or polyethylene) masking blade assemblage 15 comprises a pair of similarly dimensioned masking blades 17 and 19 with respective pivot shafts 21 and 23 connected by means of a rigid connecting link 25. The masking blades 17 and 19, the pivot shafts 21 and 23, and the connecting link 25 are integral, that is, they are formed as a unit to be one-piece or unitary. As shown in FIGS. 2-5, the connecting link 25 has overcenter spring means in the form of a closed diamond-shaped flexible loop 26 which consists of opposite-facing loop halves 27 and 28. The flexible loop 26 is located midway between the pivot shafts 21 and 23 to divide the connecting link into two equal length rigid link segments 29 and 31.

Figure 2:
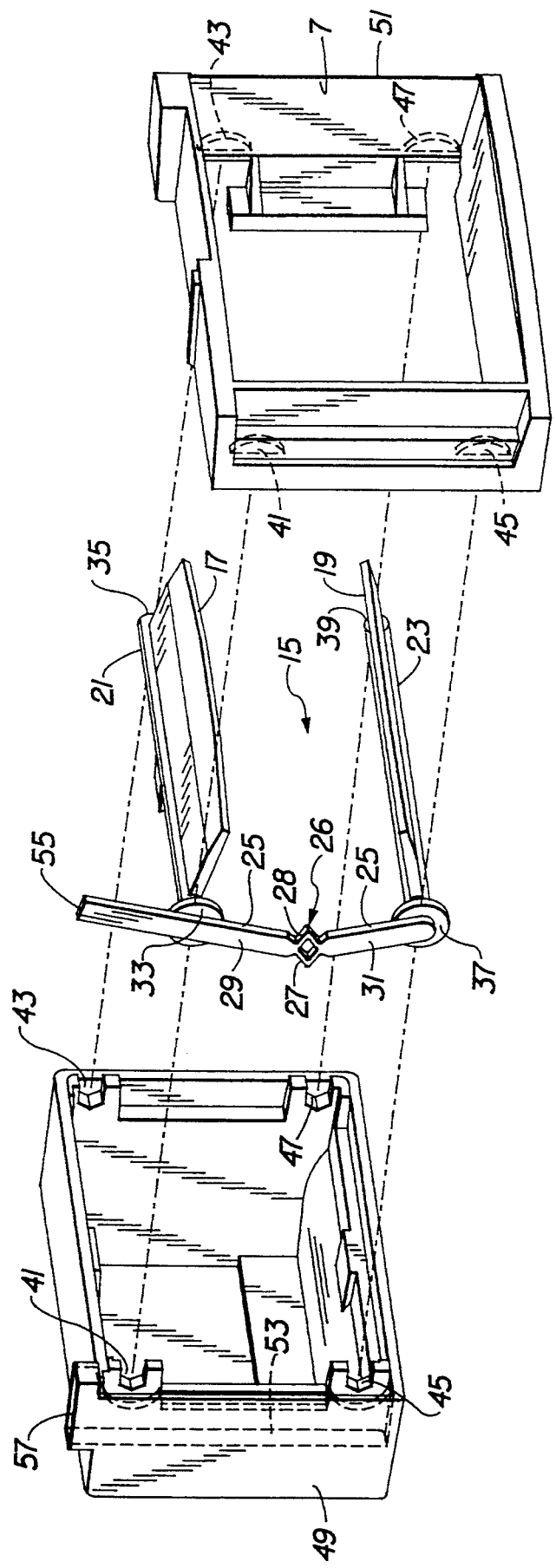
FIG. 2 is an exploded perspective view of a one-piece masking blade assemblage, including the pair of masking blades, and front and rear mounting supports within the camera body for the masking blade assemblage.

As viewed in FIG. 2, the four opposite ends 33, 35, 37, and 39 of the pivot shafts 17 and 19 fit into respective bearing recess-halves 41, 43, 45, and 47 of mating front and rear mounting elements 49 and 51 of the camera body 3 to support the masking blades 17 and 19 for pivotal movement in opposite directions between a masking position and a non-masking position. The connecting link 25 (including its flexible closed loop 26 and its two equal length link segments 29 and 31) is located in a side slot 53 formed in the front mounting element 49, and an actuation extension 55 of the pivot shaft 21 protrudes upwardly through a top opening 57 out of the side slot. See FIG. 1.

Figure 3:
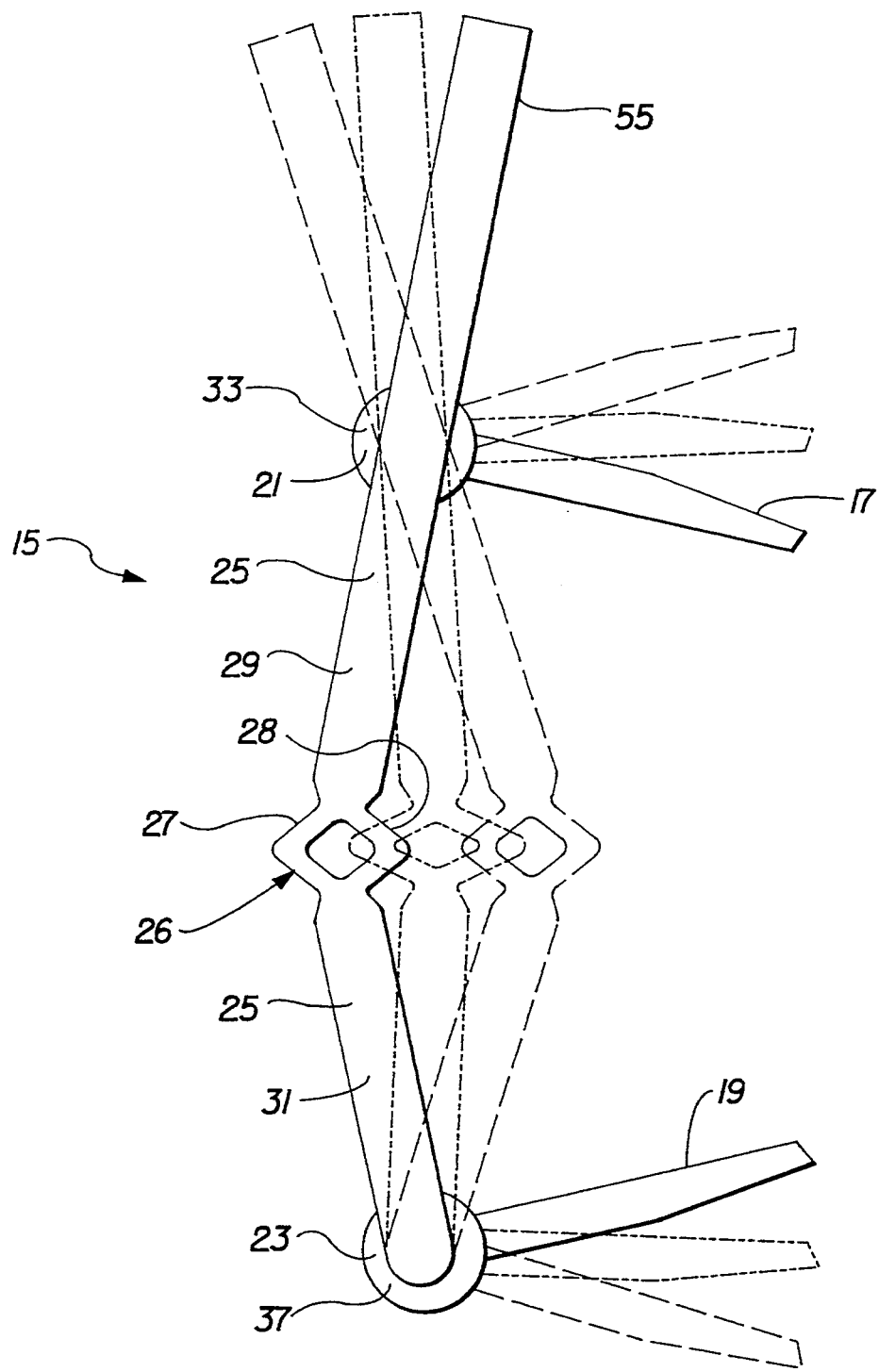
FIG. 3 is a side elevation view of the masking blade assemblage, showing its pair of masking blades in their masking position in solid line and in non-masking and intermediate positions in broken line.
Figure 6:
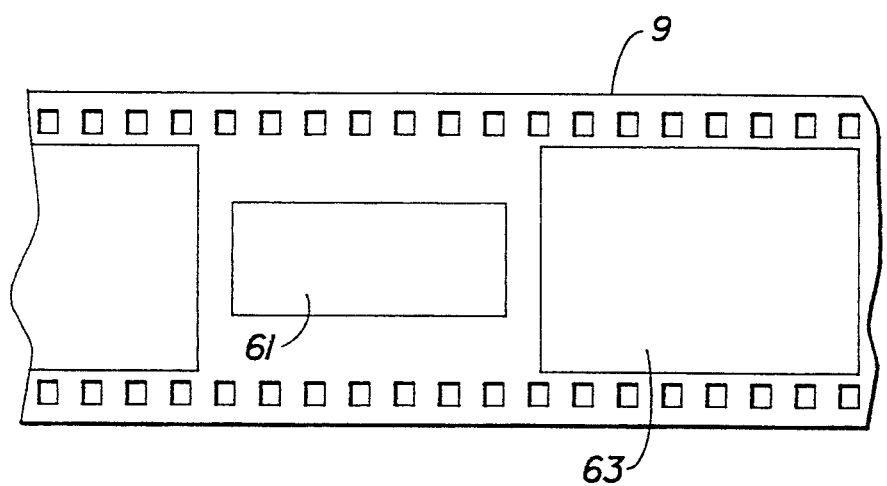
FIG. 6 is a plan view of a filmstrip with interspersed full size and panoramic size exposures.

To locate the masking blades 17 and 19 in their masking position, the actuation extension 55 is swung slightly clockwise as indicated by the arrow 59 in FIG. 4 to similarly rotate the pivot shaft 21. As the actuation extension 55 is swung slightly clockwise, the pivot shaft 23 is oppositely rotated, and the flexible closed loop 26 of the connecting link 25 is forcibly compressed by being bent at its two loop halves 27 and 28 between the rigid link segments 29 and 31. After the flexible closed loop 26 is fully compressed as shown in FIG. 3, the loop can expand or recover automatically under its own force because of the inherent straightening (memory) power of the two loop halves 27 and 28. This is the nature of a typical overcenter spring device. An overcenter spring device does not remain in an intermediate position. Once the overcenter spring device is moved slightly beyond its intermediate position, the spring device will inherently shift itself to either one of two alternative extreme positions. Thus, the masking blades 17 and 19 will be swung in opposite directions towards one another to their masking position. See FIG. 4. In the masking position, the masking blades 17 and 19 mask an uppermost rectangular portion and a lowermost rectangular portion of the back frame opening 7 to allow only a panoramic size (about 13.3 mm×36.4 mm) exposure 61 to be made on the filmstrip 9 at the back frame opening. See FIG. 6.

Figure 5:
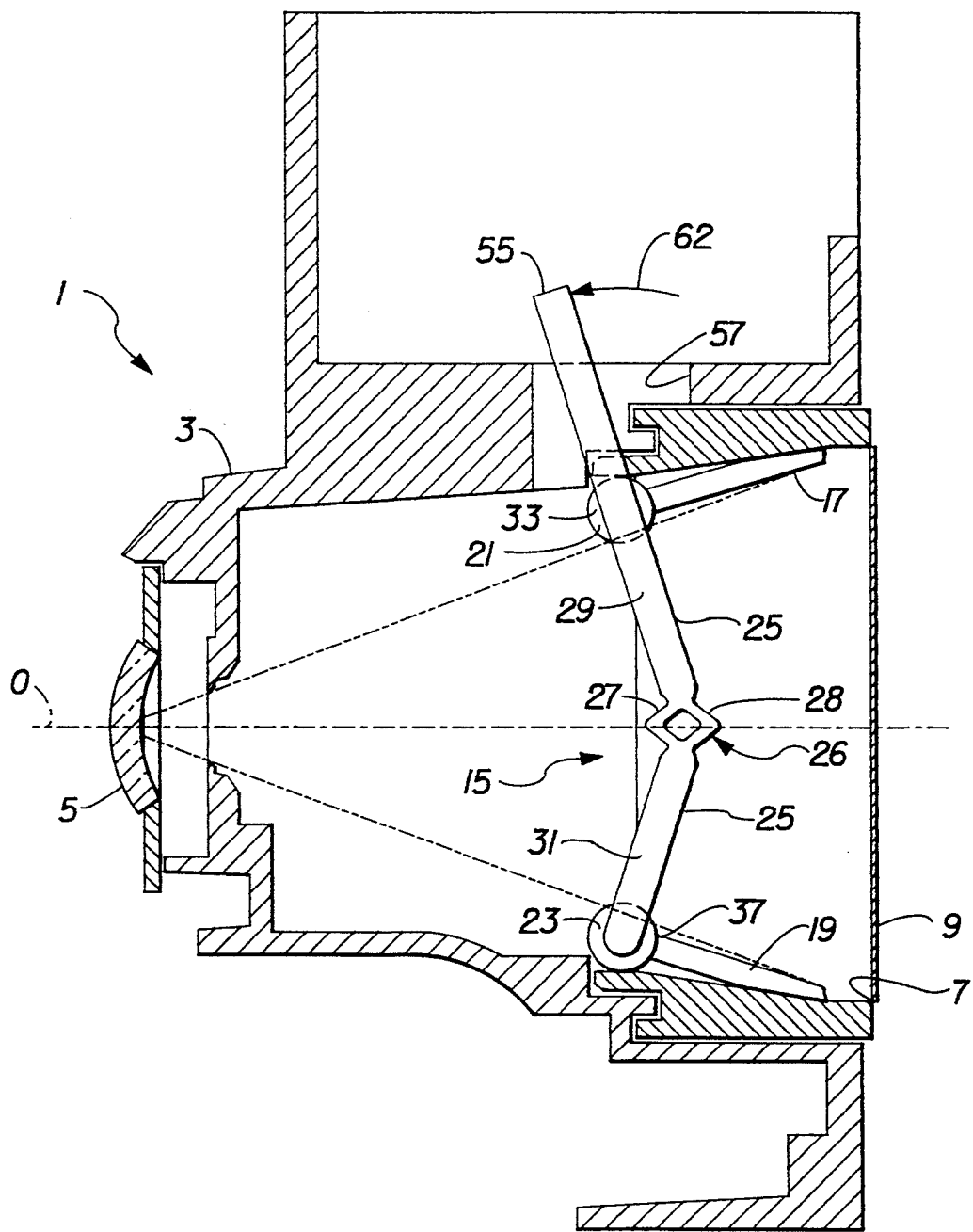
FIG. 5 is a side elevation view similar to FIG. 4, showing the masking blade assemblage with its pair of masking blades in their non-masking position.

To locate the masking blades 17 and 19 in their non-masking position, the actuation extension 55 is swung slightly counter-clockwise as indicated by the arrow 62 in FIG. 5 to similarly rotate the pivot shaft 21. As the actuation extension 55 is swung slightly counter-clockwise, the pivot shaft 23 is oppositely rotated, and the flexible closed loop 26 of the connecting link 25 is forcibly compressed by being bent at its two loop halves 27 and 28 between the rigid link segments 29 and 31. After the flexible closed loop 26 is fully compressed, the loop can expand or recover automatically under its own force because of the inherent straightening (memory) power of the two loop halves 27 and 28. See FIG. 3. Thus, the masking blades 17 and 19 will be swung in opposite directions away from one another to their non-masking position. In the non-masking position, the masking blades 17 and 19 do not mask the uppermost rectangular portion and the lowermost rectangular portion of the back frame opening 7. Instead, they allow a full size (about 24.4 mm×36.4 mm) exposure 63 to be made on the filmstrip 9 at the back frame opening. See FIG. 6.

As shown in FIG. 1, a top portion of the actuation extension 55 (that protrudes through the opening 57) is located in an opening 65 in a rocker arm 67 which is connected by means of a pivot pin 69 to the camera body 3. Movement of the rocker arm 67 in opposite directions swings the actuation extension 55 in its clockwise and counter-clockwise directions 59 and 62 as viewed in FIGS. 4 and 5. A manual format selector 71 is mounted on a transparent-plastic top plate 73 of the camera body 3 for sliding movement in opposite directions to shift a panoramic masking frame 75 either behind a front viewfinder lens 77 integral with the top plate or removed from the viewfinder lens. When the masking frame 75 is located behind the front viewfinder lens 77, it provides a panoramic view of a subject to be photographed which has an aspect ratio similar to the aspect ratio of the panoramic exposure 61. The masking frame 75 includes a depending lug 79 which is located between opposite ears 81 and 83 of the rocker arm 67 to move the rocker arm in opposite directions in accordance with movement of the manual format selector 71. Thus, when the selector 71 is moved to the right as shown in FIG. 1, the masking blades 17 and 19 will be moved to their masking position to make a panoramic size exposure 61 and the masking frame 75 will be located behind the front viewfinder lens 77. Conversely, when the selector 71 is moved to the left in FIG. 1, the masking blades 17 and 19 will be moved to their non-masking position to allow a full size exposure 63 to be made and the masking frame 75 will be removed from the front viewfinder lens 77.

The manual format selector 71 includes a spring-biased locking element 85 that alternatively is received in separate notches 87 and 89 cut in the top plate 73 When the locking element 85 is in the notch 87, the masking frame 75 is removed from the front viewfinder lens 77. When the locking element 85 is in the notch 89, the masking frame 75 is located behind the front viewfinder lens 77

The invention has been described with reference to a preferred embodiment. However, it will be appreciated that variations and modifications can be effected within the ordinary skill in the art without departing from the scope of the invention.

PARTS LIST FOR FIGS, 1-6

1. photographic camera
3. camera body
5. taking lens
7. back frame opening
0. optical axis
9. filmstrip
11. cartridge-receiving chamber
13. other chamber
15. masking blade assemblage
17 & 19. masking blades
21 & 23. pivot shafts
25. connecting link
26. flexible closed loop
27 & 28. loop halves
29 & 31. rigid loop segments
33, 35, 37, & 39. opposite ends of pivot shafts 21 & 23
41, 43, 45, & 47. bearing recess-halves
49. front mounting element
51. rear mounting element
53. side slot
55. actuation extension of connecting link 25
57. top opening
59 & 62. arrows
61. panoramic size exposure
63. full size exposure
65. opening
67. rocker arm
69. pivot pin
71. manual format selector
73. top plate
75. panoramic masking frame
77. front viewfinder lens
79. depending lug
81 & 83. opposite ears
85. locking element
87 & 89. notches

What is claimed is:

1. A photographic camera capable of taking various size exposures comprises a back frame opening for making a full size exposure on a film in said camera, and respective masking blades supported for pivotal movement between a masking position for masking corresponding portions of said back frame opening to allow only a reduced size exposure to be made on the film and a non-masking position not masking said corresponding portions of the back frame opening to allow a full size exposure to be made on the film, and is characterized in that:

said masking blades are connected via a rigid connecting link having overcenter spring means, located substantially midway between the masking blades to divide said connecting link into two similar length rigid link segments, for applying respective forces in opposite directions to said link segments to pivot the masking blades to their masking and non-masking positions.

2. A photographic camera as recited in claim 1, wherein said masking blades and said connecting link including its overcenter spring means are integral to be one-piece.

3. A photographic camera as recited in claim 1, wherein said overcenter spring means forms a closed flexible loop which is adapted to be compressed by the rigid link segments when said masking blades are midway between their masking and non-masking positions and is expanded when the masking blades are not midway between the masking and non-masking positions to urge the blades to the two positions.

4. A photographic camera as recited in claim 3, wherein said overcenter spring means is integral with said rigid link segments to be one-piece.

5. A photographic camera capable of taking interspersed full size and panoramic size exposures comprises a rectangular back frame opening for making a full size exposure on a film in said camera, and respective masking blades supported for pivotal movement between a masking position for masking an upper rectangular portion and a lower rectangular portion of said back frame opening to allow only a panoramic size exposure to be made on the film and a non-masking position not masking said upper and lower portions of the back frame opening to allow a full size exposure to be made on the film, and is characterized in that:

said masking blades are integral with a connecting link to be one-piece; and at least one elastic portion of said connecting link constitutes overcenter spring means for pivoting said masking blades to their masking and non-masking positions.

6. A photographic camera as recited in claim 5, wherein said overcenter spring means is located substantially midway between said masking blades to divide said connecting link into two equal length link segments for alternatively applying respective forces in opposite directions to said link segments to pivot the masking blades to their masking and non-masking positions.

* * * * *